Aug. 24, 1937. H. SCHMIDT 2,091,218
PROCESS FOR THE PRODUCTION OF HYDROGEN PEROXIDE
Filed June 19, 1936
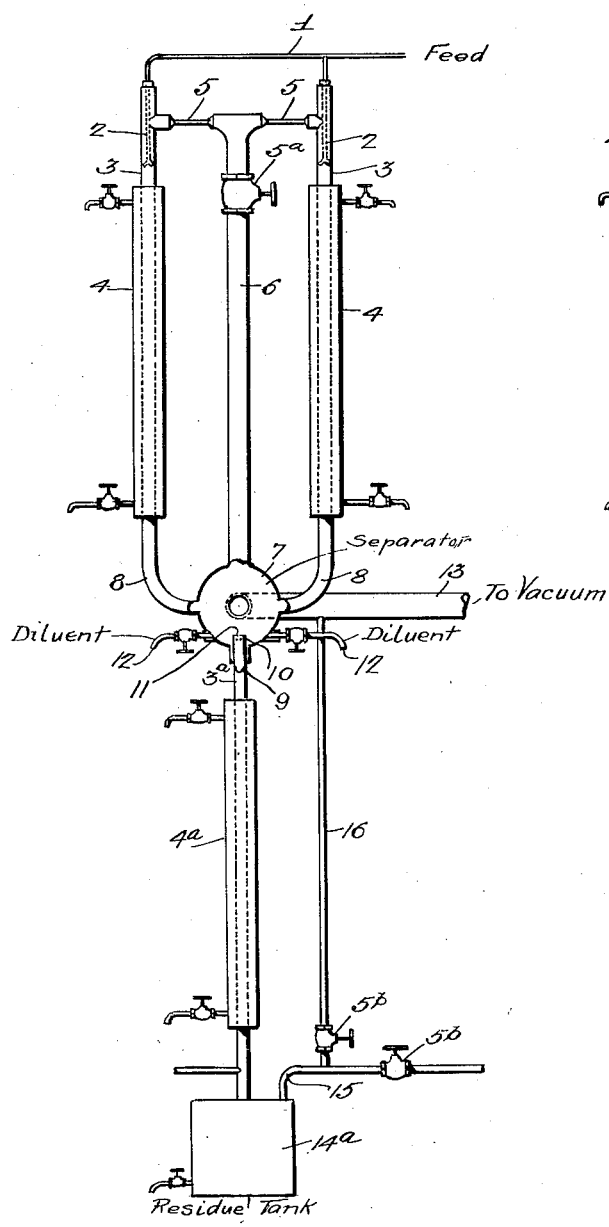
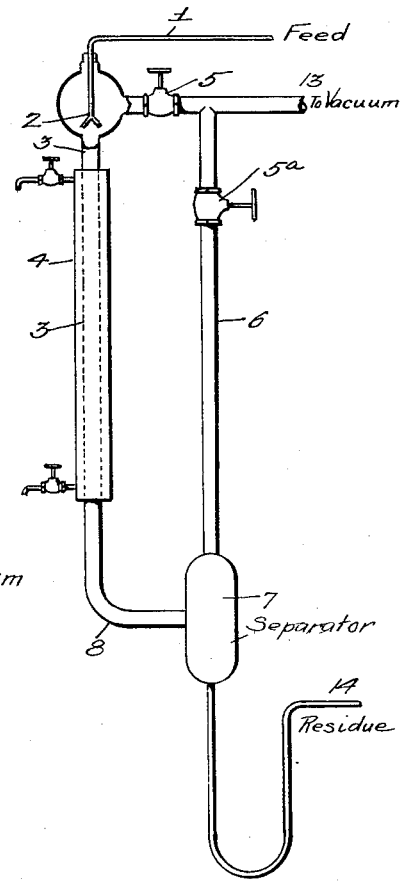
Inventor:
Heinrich Schmidt
By his Attorneys
Howson & Howson Patented Aug. 24, 1937

2,091,218

UNITED STATES PATENT OFFICE 2,091,218

PROCESS FOR THE PRODUCTION OF HYDROGEN PEROXIDE

Heinrich Schmidt, Waldorf, Germany, assignor to Pennsylvania Salt Manufacturing Company, Philadelphia, Pa., a corporation of Pennsylvania Application June 19, 1936, Serial No. 86,194
In Germany June 22, 1935

12 Claims. (Cl. 202—52)

This invention relates to new and useful improvements in methods and processes for the preparation of hydrogen peroxide, and more particularly it relates to a novel process for the distillation of solutions of per-salts or per-acids, particularly of solutions of per-sulphates, to obtain hydrogen peroxide therefrom.

It is well known that hydrogen peroxide or solutions from which such peroxides are formed, are readily decomposed when subjected to heat, and it has been proposed therefore to prepare hydrogen peroxide by allowing a suitable solution to flow downwardly along the inside walls of tubes or pipes or other suitable distillation apparatus in a thin layer or film, while heat is applied externally of the apparatus, thus decomposing the solution and allowing the resulting vapors or distillate containing hydrogen peroxide to be drawn off at the top of the apparatus at or adjacent the point of entrance of the solution thereto.

However, this method of preparing hydrogen peroxide has several objectionable features and is particularly disadvantageous for the reason that friction is created by the counter-flow of the thin film or layer of the solution employed and the rising vapors or distillate, thus retarding the downward flow of the the former and adversely effecting distillation. Such method or process is further objectionable for the reason that the velocity of flow of the film of the solution as well as its thickness, the rate of evaporation thereof, and the effective heating surface provided are all largely controlled by the diameter of the tubes and pipes of the particular distillation apparatus. In addition, in preparing hydrogen peroxide by means of these known methods or processes of distillation, it has been found that the salt content of the solutions employed such as, for example, persulphate, renders such solutions substantially viscous and extremely difficult to handle. The viscosity of the solution and the friction created prevent a sufficiently rapid superheat, and increase the loss due to catalysts which generally accumulate in a cyclic process, thus considerably reducing the yield.

The principal object of the present invention, therefore, is to provide a distillation method or process for preparing hydrogen peroxide wherein the foregoing objectionable features and disadvantages are substantially entirely eliminated and which at the same time will produce a maximum yield irrespective of the degree of concentration and catalyst content of the solutions employed, and regardless of changes or variations in the velocity of flow of such solutions.

Another object of the present invention is to provide a distillation method or process of the character set forth for the preparation of hydrogen peroxide, wherein friction between the film or layer of the solution to be distilled and the resulting vapors or distillate is substantially eliminated so that said film or layer will be of substantially uniform thickness.

Another object of the present invention is to provide a method or process of the stated character wherein the velocity of flow of the film or layer of the solution and the thickness thereof as well as the rate of distillation may be accurately controlled with respect to any given area of heating surface and the catalyst content of such solution.

A further object of the invention is to provide a novel process or method of the character set forth which is characterized by substantially uniform distillation, the use of distilling tubes of relatively small diameter and wherein the tendency of the solution to become viscous due to salt content thereof is substantially entirely eliminated.

Other objects and the features and details of the invention are set forth more particularly hereinafter.

As distinguished from the prior practices, I have found that hydrogen peroxide can be very efficiently prepared by the distillation in a thin film or layer of persulphate, or other suitable solution, which is allowed to flow downwardly along the inside wall of a tube, pipe or other distilling apparatus, the resulting vapors or distillate being removed or drawn off not only from the top but also from the lower end of the tube or the like. By suitable control, for example by valves or other restrictions in the vapor lines leading from the top and bottom of the distilling tube, it is possible to control the velocity of flow of the solution and at the same time the thickness of the film and rate of distillation. In this manner, the flow through the distilling tube can be adjusted to a given amount of heating surface and the concentration of catalysts in the solution to obtain the maximum recovery of hydrogen peroxide from a given solution without undue loss by decomposition. In distilling solutions having a high catalyst content, for example, good yields are obtained by controlling the flow of the vapors so that a high downward velocity of the solution exists, resulting in the formation of a very thin film.

The friction previously encountered during the distillation is largely eliminated by the present process, and a film of uniform thickness in the distilling tube is obtained. The relatively high vacuum exerted at both the top and the bottom of the distilling apparatus results in a very uniform distillation and makes possible the use of tubes of small diameter which permits the effective use of the heating surface. High yields are possible, for the first time, from the distillation of concentrated solutions of per-salts, regardless of changes in the flow of the solution. Previously, it has been essential to maintain a uniform flow of solution through the tubes which is very difficult.

The type of distillation apparatus employed is relatively unimportant so long as a tube, to which suitable heat and vacuum may be applied, is provided through which the solution to be distilled may flow. A single stage distillation operates entirely satisfactorily, but, if desired, the distillation may be carried out in two distilling tubes in series with the addition of a diluent between the two tubes. Two or more distilling tubes in parallel connected to a single feed and separator may also be used, if desired. Instead of employing two tubes in series, a diluent may be added to the single tube if it is advantageous to lower the concentration of the liquor being distilled.

The process is particularly applicable for use in the distillation of solutions of per-salts and per-acids, especially solutions containing per-sulphate or per-sulphuric acid. Herein, the term "per-sulphate solution" is employed to include solutions of per-sulphuric acid as well as per-sulphates.

Several forms of apparatus suitable for carrying out the method or process in accordance with the invention are shown in the attached diagrammatic drawing, Figures 1 and 2.

Referring to the drawing Figure 1, reference numeral 1 designates a feed or inlet tube having its discharge end located in a distributor 2 placed in the upper end of a distilling tube 3 which is enclosed with a jacket 4 and heated by any suitable means such as steam. The upper end of the distilling tube 3 is connected to the separator 7 by means of a regulator or valve 5 and a tube 6 which extends parallel to the distilling tube 3. A valve or restriction 5a is placed in the tube 6. The lower end of the distilling tube 3 is connected to the separator 7 by means of pipe 8. The residual liquor is collected at 14, while the hydrogen peroxide vapors and steam are removed at 13. The whole system is maintained under a suitable vacuum by means of a vacuum pump and suitable connections (not shown) to pipe 13.

Referring to Figure 2, the same reference numerals are employed to designate the same elements. Reference numeral 1 designates a feed or inlet tube having its discharge ends located respectively in each of a pair of distributors 2 formed at the upper ends of distilling tubes 3 which are enclosed within jackets 4 and heated by any suitable means such as steam. The upper ends of each of the distilling tubes 3 are connected to the upper end of a separator 7 by means of regulators or valves 5 and a tube 6 which extends parallel to and between said distilling tubes 3. A valve 5a or other control means is placed in the pipe 6. The lower ends of the distilling pipes 3 are connected to said separator 7 at opposite sides centrally thereof by means of tubes or pipes 8. An outlet tube 9 having a series of apertures or holes 11 extending circumferentially thereof adjacent its upper end 10, is located in the bottom of the separator 7 with its upper end 10 extending a short distance inwardly of said separator, for a purpose which will be set forth hereinafter. As shown, other inlet tubes 12 controlled by valves, communicate with the separator 7 adjacent the lower end of the separator 7 at either side of the outlet 9 and an exhaust tube 13 having operative connection to a suction pump leads from said separator at one side thereof mid-way between the upper and lower ends of the outlet 9 and tube 6 respectively.

In addition to the foregoing, a second distillation tube 3a similarly provided with a heating jacket 4a has its upper and lower ends connected respectively to the outlet tube 9 of the separator 7 and a receiver or receptacle 14a which latter is in turn connected to the exhaust pipe 13 and the suction pump (not shown) by means of pipes, tubes or the like 15 and 16 respectively, controlled as desired by means of valves 5b located respectively therein.

To prepare hydrogen peroxide in accordance with my invention, the solution to be distilled is fed through the tube or pipe 1 into the distributor 2 from which it is allowed to flow by gravity in a thin film or layer downwardly along the inside walls of the distilling tube 3, and steam at a pressure of approximately 4 atmospheres is passed through the heating jacket 4 for the purpose of vaporizing or distilling said solution during such downward flow thereof. As distillation of the solution or film progresses the resulting vapors are drawn off from both ends of the distilling tube 3 and removed by means of the suction pump (not shown) which is operatively connected to the exhaust pipe 13.

In carrying out the present process or method, variations in the velocity of flow of the thin layer or film of the solution downwardly along the interior of the tube 3 may be effectively controlled by the cross sectional flow area of the regulators or valves 5 and 5a thus making it possible to provide a film or layer of the solution of maximum thickness for distillation purposes. It will be observed that these flow regulators or valves have been provided at each point in the apparatus where the resulting vapors of distillation are evacuated or drawn off for the purpose of permitting the velocity of the vapors at the end of the tubes to be throttled so that the process of disillation and rate of flow may be retarded.

The ultimate yield of hydrogen peroxide prepared in accordance with the present process or method depends in part upon the particular solution and diluent employed therein, and in part upon the physical conditions under which distillation of such solution takes place. For example, a very high yield may be obtained by using a solution containing approximately 260 grams per litre persulphate, 190 grams per litre sulphuric acid and 30 grams per litre ammonium sulphate, as well as impurities of a catalytic nature, such solution being preferably prepared by electrolysis. The inside diameter of the tube 3 of the apparatus employed should be approximately 25 m. m. and the flow regulator or valve 5 at the upper end of said tubes preferably set or adjusted so that the cross sectional flow area therethrough is approximately equal to two-thirds of the cross sectional area of the distilling tube. The suction force at the lower end of the distilling tube 3 should not be throttled and the best results have been obtained when a suction or vacuum of 38 m. m. is employed, and distillation of the solution is brought about by heating the tube by passing steam at a pressure of approximately 4 atmospheres through its heating jacket 4. In addition, the flow of the solution into the tube should be adjusted or regulated in accordance with the efficiency of the evaporator which depends upon the material from which the distilling tubes are fabricated, so that the residual solution leaves the tube 3 without the precipitation of salt. If the process of the invention is to be carried out in the apparatus of Figure 2, the distillation in tubes 3 is not complete and approximately .03 litre of diluent for each litre of solution is added to the solution between the two steps of distillation. Advantageously, the diluent contains 30% feed solution, the balance being water.

The present method or process may also be carried out under substantially the same physical conditions set forth in the preceding paragraph to obtain a hydrogen peroxide yield of more than 85% with a solution containing 260 gm. $(NH_4)_2S_2O_8$, 210 gm. $H_2SO_4$ and 120 gm. $(NH_4)_2SO_4$ per litre. In this particular instance, however, the inside diameter of the distilling tube 3 should be greater than 25 m. m., and the flow of the solution through the still adjusted in accordance with its evaporating efficiency, so that crystallization can take place during distillation of said solution.

In carrying out the process in the apparatus illustrated in Figure 2, distillation of the solution in the tubes 3 is, however, incomplete and the solution from the separator 7 is further distilled in tube 3a. The diluent is introduced into said separator through the pipes 12 for mixture with the solution. A sufficient interruption in the flow of the solution to insure proper mixture of the diluent therewith is effected by the upwardly projecting end portion 10 of the separator outlet 9 which functions as a dam to prevent such solution from flowing immediately into the secondary distilling tube 3a, until such mixture is complete and a sufficient quantity of the solution has accumulated within the separator 7 to cause it to overflow through the apertures or holes 11 in the upper end 10 of said tube 9. As this mixture of the solution and diluent overflows through the apertures or holes 11, it is distributed over the inner wall surfaces of the secondary distilling tube 3a in the form of a thin film or layer and allowed to pass downwardly therealong, where it is again subjected to heat from the jacket 4a and distillation finally completed. The vapors resulting from this stage of the process of distillation are likewise drawn off both from the upper end of said tube 3a into the separator through the outlet 9 and from the lower end thereof through the receiver or receptacle 14 and are exhausted from the latter through tubes or pipes 15 and 16 controlled by flow regulators or valves 5b and from said separator 7 by means of a suction pump (not shown), which is operatively connected to the latter and the pipe 16 by means of the exhaust tube 13. The residual liquor is collected in tank 14. It is also possible in this secondary distilling tube to exert considerable suction by the exhaust vapors from the separator, and in this way to utilize the reduction of rate of flow of the solution by friction of the vapor, and permit considerable superheating, in order to separate the active oxygen from the residue.

While the diluent may be water, it is advantageous to use a solution containing chemicals of the type present in the solution being distilled as the diluent, and this may be the diluted residual liquor from the still which always contains a small quantity of active oxygen, or it may be the solution to be distilled in a diluted or undiluted condition. By the use of such salt or acid solutions, preheated if desired, evaporation is not as likely to take place as when water alone is added due to the higher boiling point of the solution. Thus considerable loss of heat is avoided as well as the condensation of additional vapors.

Considerable modification is possible in the type of solution being distilled and in the distilling apparatus employed, as well as the control of the valves or regulators of the apparatus without departing from the essential features of my invention.

I claim:

1. The steps in the method of distilling solutions to obtain hydrogen peroxide therefrom which comprise flowing the solution to be distilled downward on the inner wall of a heated distilling tube, removing the vapors resulting from the distillation at points adjacent both the upper and lower ends of said tube, and removing the residual liquor from the lower end of said tube.

2. The steps in the method of distilling solutions of persulphate to obtain hydrogen peroxide therefrom which comprise flowing the solution to be distilled downward on the inner wall of a heated distilling tube, controlling the distillation process by regulating relatively the upward and downward flow of the vapors resulting from the distillation in accordance with the conditions of the liquid being distilled and of the distillation, removing the vapors resulting from the distillation at points adjacent both the upper and lower ends of said tube, and removing the residual liquor from the lower end of said tube.

3. The steps in the method of distilling solutions to obtain hydrogen peroxide therefrom which comprise flowing the solution to be distilled downward on the inner wall of a heated distilling tube, removing the vapors resulting from the distillation at points adjacent both the upper and lower ends of said tube, removing the residual liquor from the lower end of said tube, and thereafter diluting the liquor undergoing distillation and subjecting it to a continuation of the distillation to recover hydrogen peroxide separated therefrom.

4. The process of claim 3 in which the diluent employed is a solution containing chemicals of the type present in the solution being distilled.

5. The process of claim 3 in which the diluent employed is a diluted portion of the liquid residue resulting from the distillation.

6. The steps in the method of distilling solutions of persulphate to obtain hydrogen peroxide therefrom which comprise flowing the solution to be distilled downward on the inner wall of a heated distilling tube, regulating the upward and downward flow of the vapors resulting from the distillation in accordance with the condition of the liquid being distilled and of the distillation by controlling said flow by regulators installed in the vapor lines, removing the vapors resulting from the distillation at points adjacent both the upper and lower ends of said tube, and thereafter diluting the liquid undergoing distillation and subjecting it to a continuation of the distillation to recover the hydrogen peroxide separated therefrom.

7. The process of claim 6 in which the diluent employed is a solution containing chemicals of the type present in the solution being distilled.

8. The process of claim 6 in which the diluent employed is a diluted portion of the liquid residue resulting from the distillation.

9. A method of distilling solutions to obtain hydrogen peroxide therefrom, which comprises flowing the solution to be distilled downward on the inner wall of a heated distilling tube, removing the resulting vapors from said tube at points spaced longitudinally of the tube, and controlling the distillation process by differentially varying the rates of removal of the vapors at said points.

10. A method of distilling solutions to obtain hydrogen peroxide therefrom, which comprises flowing the solution to be distilled downward on the inner wall of a heated distilling tube, removing the resulting vapors from said tube at points spaced longitudinally of the tube by the application of suction exerted thereon from a single source, and controlling the distillation process by differentially varying the rates of removal of the vapors at said points.

11. Apparatus for distilling solutions to obtain hydrogen peroxide therefrom, comprising a distilling tube, means for feeding the solution onto the inner wall of said tube at the upper end thereof, means for heating said tube as the solution flows downward along the inner wall thereof, means for removing vapors from the upper end of said tube, means for removing vapors from the lower end of said tube, and means for differentially varying the rates of removal of the vapors by the respective means therefor, to thereby control the distillation process.

12. Apparatus for distilling solutions to obtain hydrogen peroxide therefrom, comprising a distilling tube, means for feeding the solution onto the inner wall of said tube at the upper end thereof, means for heating said tube as the solution flows downward along the inner wall thereof, a suction source, means connecting said source to the upper end of said tube for removing vapors therefrom, means connecting said source to the lower end of said tube for removing vapors therefrom, and means for selectively controlling the rates of removal of said vapors to thereby control the distillation process.

HEINRICH SCHMIDT.